United States Patent [19]
Carvey

[11] 3,975,592
[45] Aug. 17, 1976

[54] ELECTROGRAPHIC SYSTEM

[75] Inventor: Philip P. Carvey, Bedford, Mass.

[73] Assignee: Applicon Incorporated, Burlington, Mass.

[22] Filed: Jan. 23, 1975

[21] Appl. No.: 543,645

[52] U.S. Cl. .................................. 178/18; 178/19
[51] Int. Cl.² ................... G08C 21/00; H03K 13/20
[58] Field of Search............ 178/18, 19, 20; 33/1 M; 340/347 AD, 347 NT; 328/108

[56]  References Cited
UNITED STATES PATENTS

| | | | |
|---|---|---|---|
| 3,342,935 | 9/1967 | Leifer et al. ........................... | 178/19 |
| 3,732,369 | 5/1973 | Cotter.................................... | 178/18 |
| 3,906,377 | 9/1975 | Harris ................................... | 328/108 |

OTHER PUBLICATIONS

U.S. Published Application of DYM, Ser. No. B343,577, dated Jan. 28, 1975, entitled "High Resolution Graphic Data Tablet."

Primary Examiner—Thomas A. Robinson
Attorney, Agent, or Firm—Schiller & Pandiscio

[57] ABSTRACT

An electrographic input system comprises a set of a first plurality of electrical conductors and a second plurality of electrical conductors arranged so as to form a coordinate system. The conductors of the first plurality are sequentially energized at a fast scan rate so as to provide a high intensity electric field in proximity to each energized conductor. A moveable probe is provided for sensing the electric field provided by each of the first plurality so as to provide a first signal responsively thereto. A selected number of the first plurality of conductors is energized at a slow scan rate so as to provide a plurality of second signals, each representative of the electrical field intensity strength between the probe and each of the selected number of conductors energized during the slow scan. Means are provided for determining the centroid of the second signals and for generating a third signal in response thereto. This third signal is indicative of the probe position with respect to the first plurality of conductors. The signals are then determined for the second plurality of grid conductors.

10 Claims, 10 Drawing Figures

ELECTROGRAPHIC SYSTEM

This invention relates in general to electrography and more particularly to graphical data processing input systems which generate electrical signals that are indicative of the position of a moveable stylus upon the face of an adjacent writing tablet.

Various types of graphical data processing input systems for indicating coordinates of a moveable stylus positioned in proximity to the writing surface of a tablet are known. Many of these systems generally employ a tablet having a grid system of crossed electrical conductors and means for applying voltages on the conductors in order to create electrical fields in proximity to the conductors. This type of system also usually includes a probe or stylus which detects the electrical fields created by the energized conductors when the probe is in proximity to any one of the conductors. By correlating the detected signal with signals representative of the grid conductors energized, the coordinate position of the probe relative to the grid can be identified.

It is therefore the primary object of the present invention to provide an improved electrographic system of the type described.

It is another object of the present invention to provide a novel system in which the location of a moveable stylus is first coarsely sensed and then finely sensed in accordance with an improved technique so that the position of a stylus is accurately determined relative to a coordinate grid of a tablet surface.

Yet another object of the present invention is to provide an improved electrographic system which includes a dual slope integrator for interpolating the location of a moveable stylus relative to conductors of a grid system.

These and other objects are achieved by a system which comprises a tablet having a set of a first plurality of electrical conductors and a second plurality of electrical conductors arranged so as to form a coordinate system. The first plurality of conductors are each energized so that an electrical field is provided in proximity to each of the energized conductors. Probe means for sensing the electric field provided by each of the energized conductors provides a first electrical signal in response thereto. Means are provided which are responsive to the first electric signal for sequentially energizing a selected number of the conductors of the first plurality so as to provide a plurality of second signals. Each of the latter represents the electric field intensity strength between the probe means and each of the selected number of conductors during a predetermined period of time. Means are provided for determining the centroid of the second signals and for generating a third signal which is representative of the position of the probe means relative to the first plurality of electrical conductors.

The second plurality of conductors are then each energized so that the probe means provides a fourth signal in response to electric fields around the conductors of the second plurality in proximity to the probe. In response to the fourth signal, a selected number of the conductors of the second plurality are energized for a second preselected period of time. A plurality of fifth electrical signals are provided, each representative of the electric field intensity strength between the probe means and each of the selected number of conductors of the second plurality during the second preselected period of time. Means are provided for determining the centroid of the fifth signals and for producing a sixth signal which is representative of the position of the probe means relative to the second plurality of conductors.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention reference should be had to the following detailed description taken in connection with the accompanying drawings wherein.

Figure 4D:
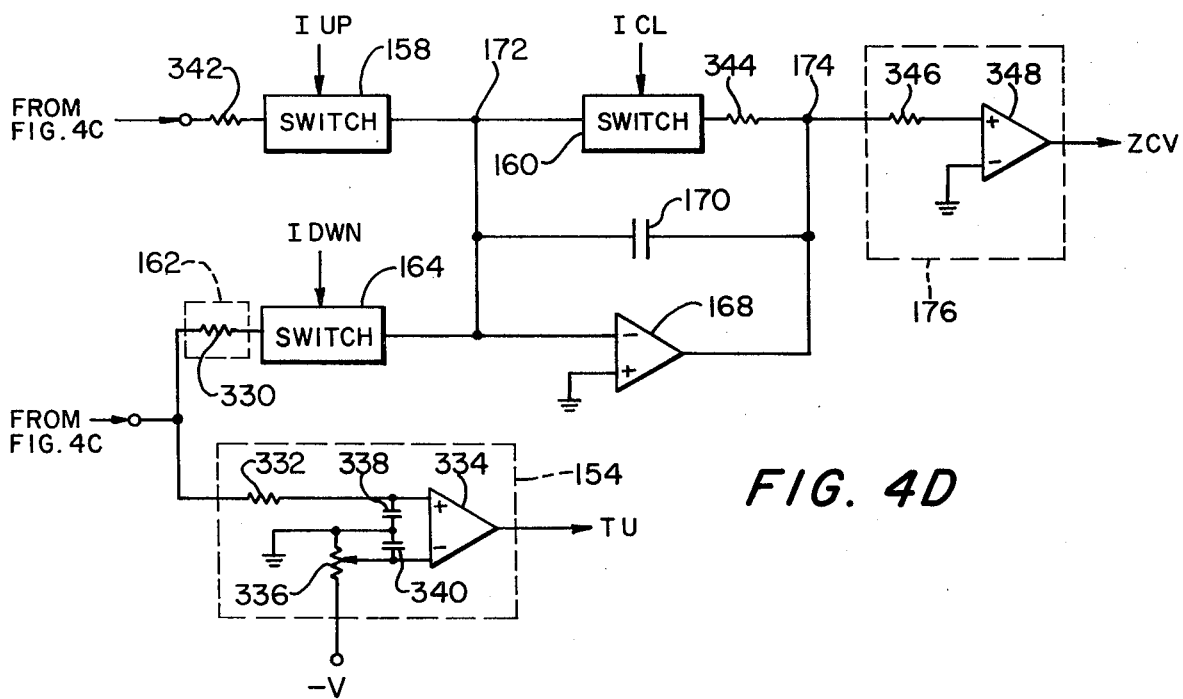
Figure 3:
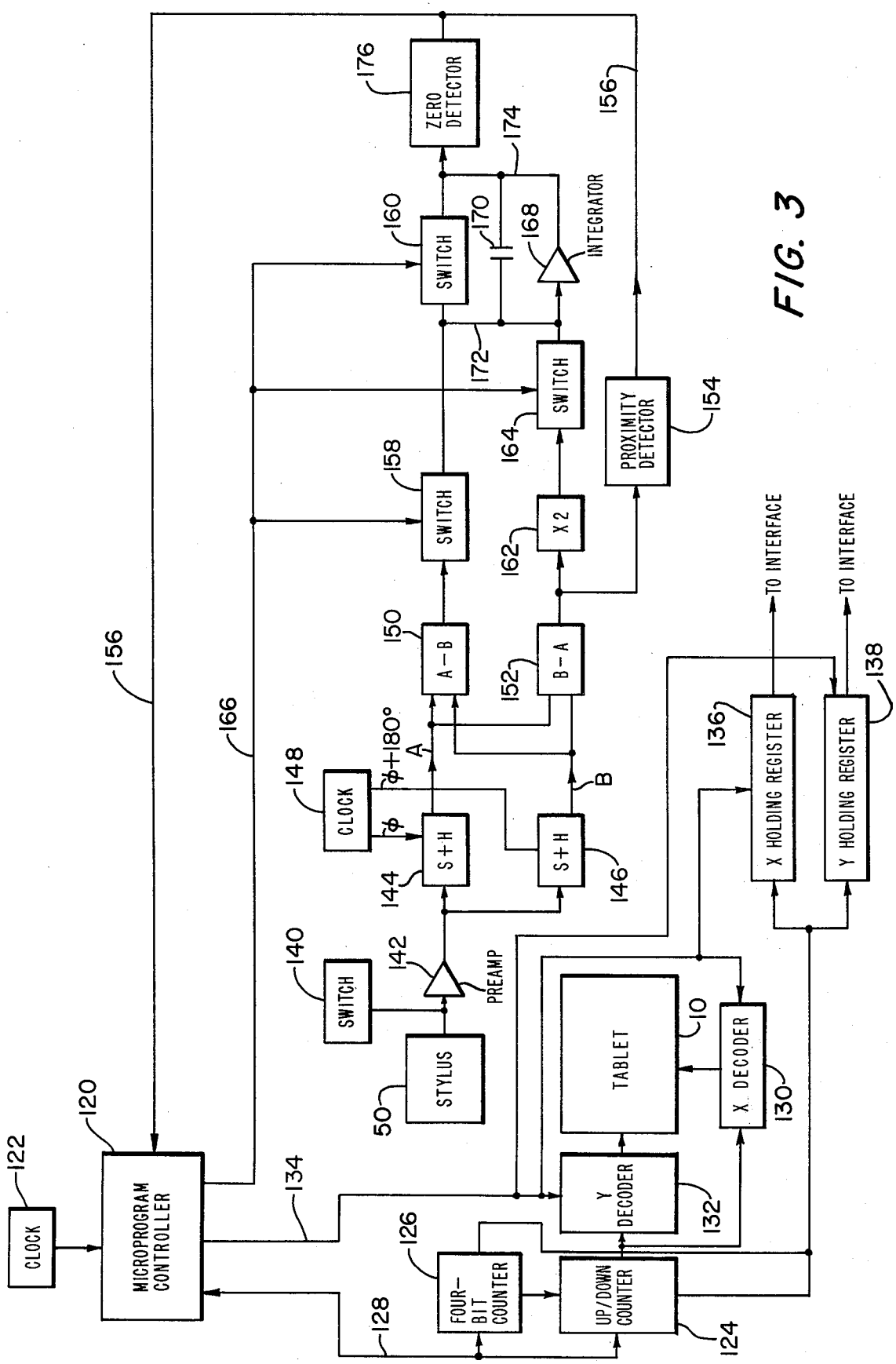
FIG. 3 is a block diagram of an embodiment of the present invention; invention.
Figure 4A:
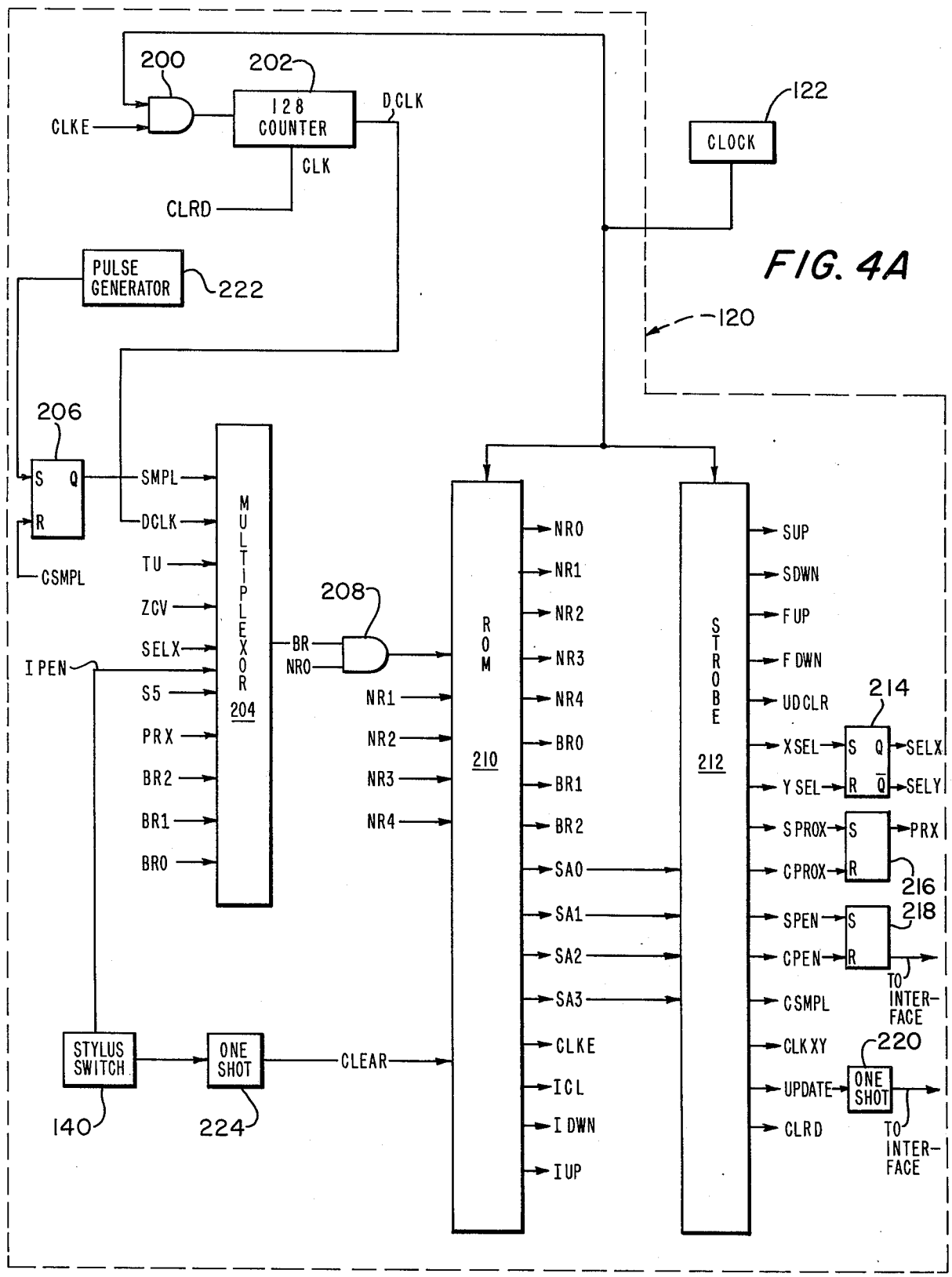
Figure 4C:
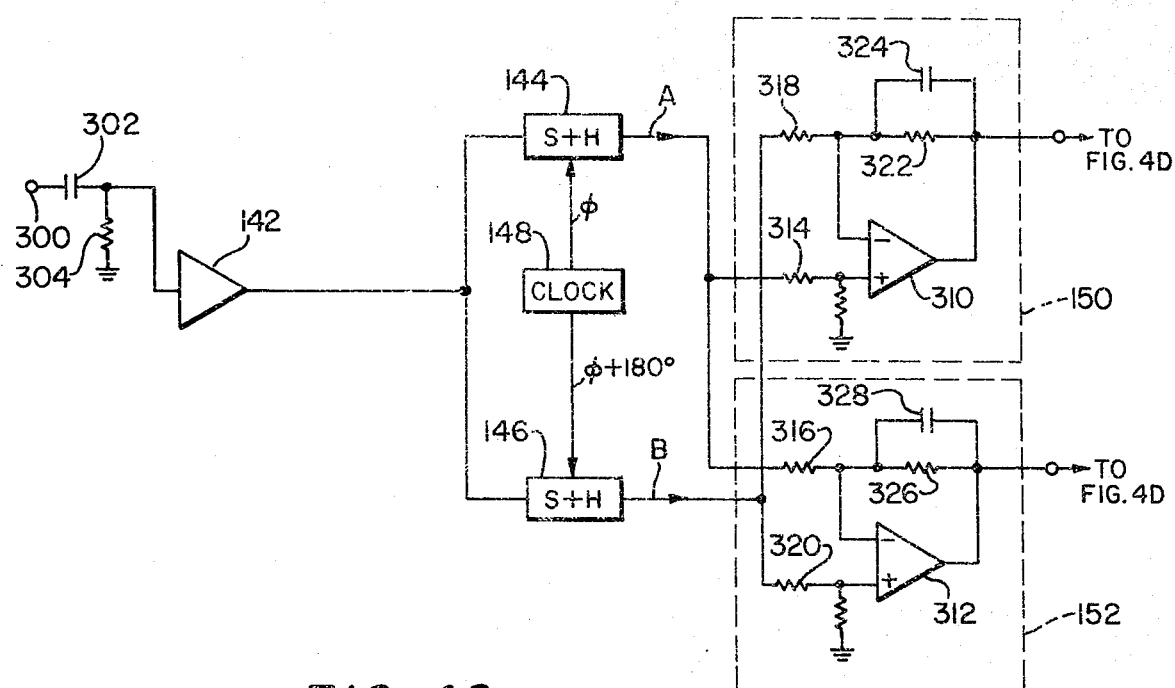
Figure 4B:
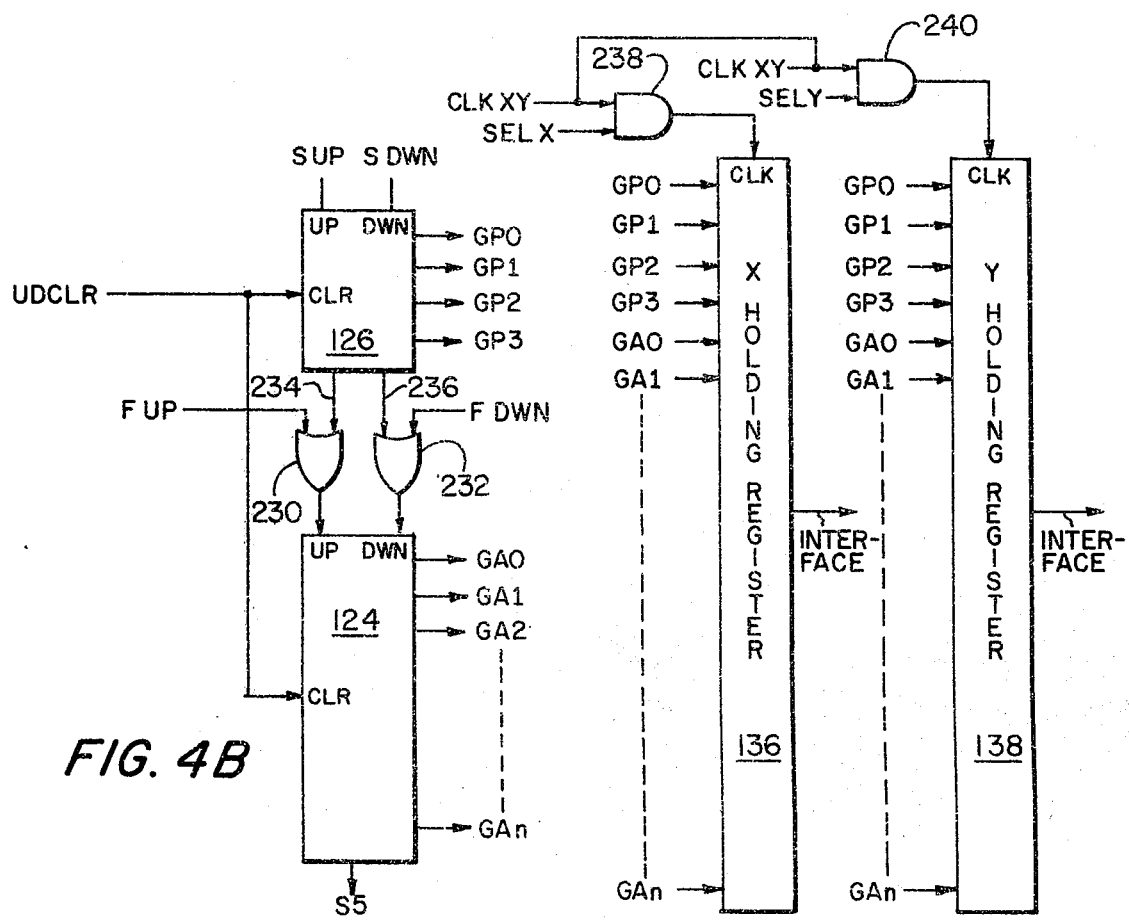
Figure 5:
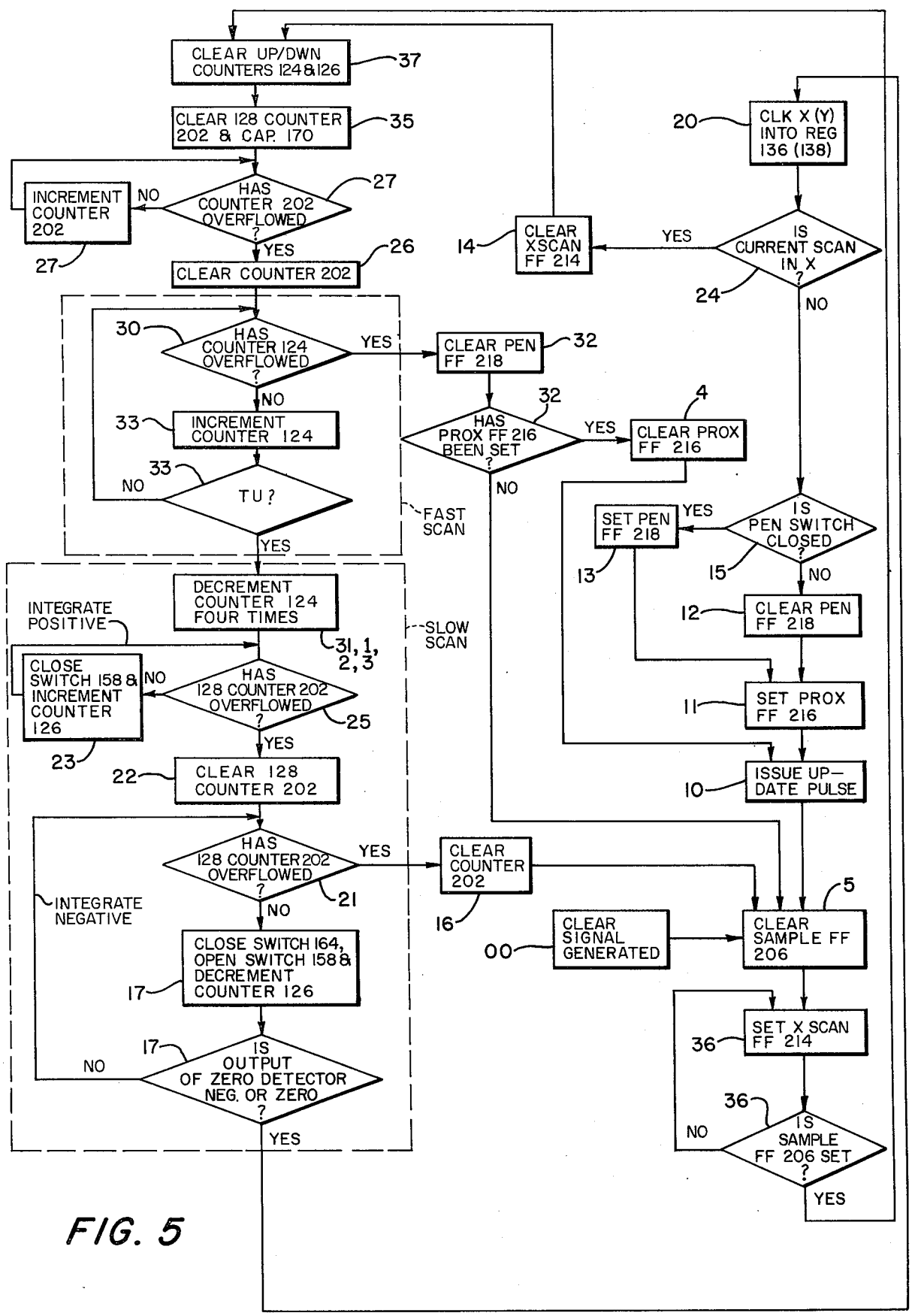
Figure 6:
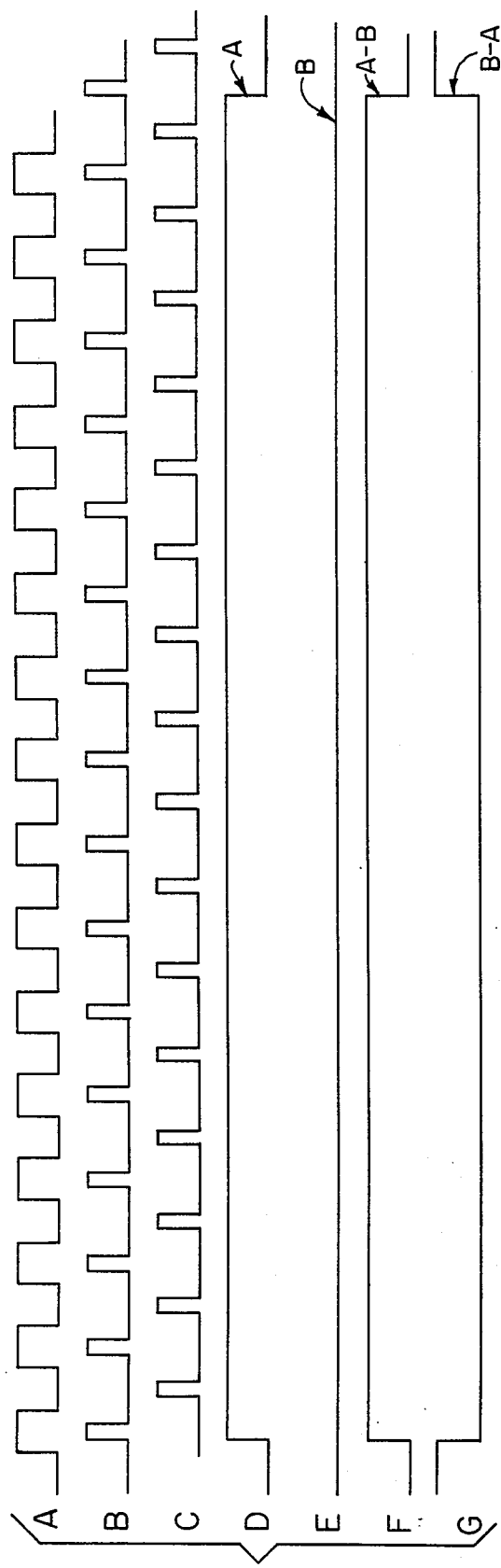
Figure 7:
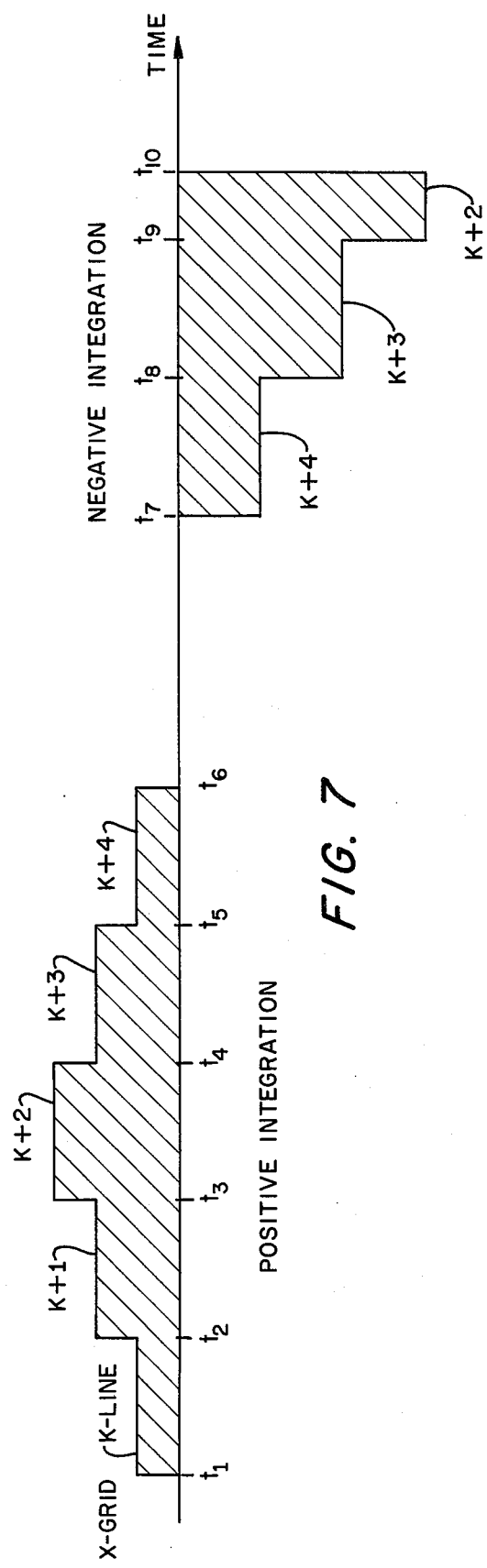

FIGS. 4A–D are detailed logic diagrams of the embodiment of FIG. 3;

FIG. 5 is a flow chart of the program utilized in the microprogram controller of the embodiment shown in FIG. 4;

FIG. 6 is a graphical representation of certain signal wave forms plotted to a common time scale which facilitate an understanding of the operation of the embodiment described; and FIG. 7 is a graphical representation of a signal wave form which will facilitate an understanding of the invention.

In the drawings the same numerals are used throughout the several views to identify like parts.

Figure 1:
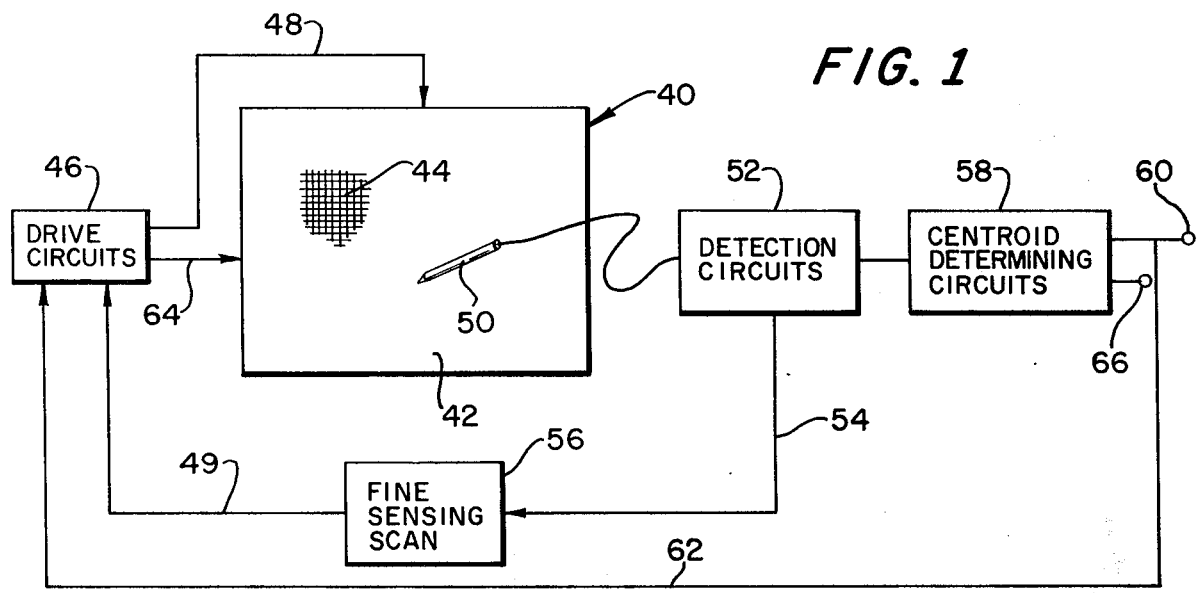
FIG. 1 is a pictorial diagram, partly in block schematic form, of an embodiment of the present invention.

Referring to FIG. 1, a graphical data processing input system of the present invention includes a tablet 40 which comprises a two coordinate grid system shown only partially in FIG. 1 exposed below the writing surface 42. The grid essentially comprises two sets of electrical conductors 44, one set for each coordinate. All of the conductors are in a non-contacting relation. Further all of the conductors for each coordinate set are equally spaced from the surface 42 with the conductors of one set being disposed below the conductors of the other set. In the preferred embodiment, the conductors are disposed to form a Cartesian coordinate system wherein the conductors of one set of coordinates are all disposed parallel to one another to define a vertical or Y coordinate and the conductors of the other set are disposed parallel to one another in a direction perpendicular to the first set of conductors to define a horizontal or X coordinate. It is to be understood, however, that the present invention can work equally well with the conductors disposed to form either a cylindrical or polar coordinate system.

Drive circuits 46 are connected to the vertical grid conductors of the X coordinate by line 48 so that each of the conductors of the coordinate can be sequentially energized at a first predetermined coarse or fast scanning repetition rate. When each grid conductor is energized, an electric field is provided in the vicinity of the surface 42 which is substantially of uniform strength in a direction generally parallel to the energized conductor. A probe or stylus 50 is freely moveable over this entire area defined by the surface 42 of the tablet 40.

The probe, which is well known in the art, is designed so that it is capable of sensing the electric field through detection circuits 52 when the stylus is in proximity to an energized grid conductor. The electric field of a particular grid conductor is sensed by the circuits 52, and the latter will provide a fine or slow sensing scan signal over the line 54 to a fine or slow sensing scan circuit 56. The latter causes the drive circuits 46 to energize a selected number of conductors 44 of the X coordinate in the vicinity of the probe to be sequentially energized over line 48 at a second predetermined rate for a prescribed period of time. The detection circuits 52 provide a plurality of signals, each representative of the electric field strength between probe 50 and each of the selected number of conductors energized during the fine sensing time period. Circuit means 58 receives the plurality of signals from circuits 52 and provides an output signal to the terminal 60 which is representative of the centroid of its input signals. This output signal is indicative of the location of stylus 50 in the X direction. The output signal at terminal 60 is transmitted over line 62 to the drive circuits 46, which in turn drive over line 64 the horizontally directed or Y grid conductors. The process is then repeated whereupon the output at terminal 66 indicates the location of the stylus 50 in the Y or vertical direction.

Figure 2:
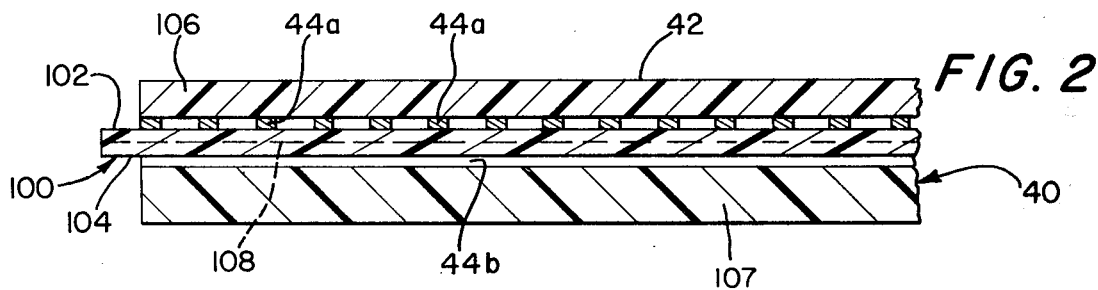
FIG. 2 is a partial cross-sectional view taken through a tablet of the present invention.

The tablet 40 of the preferred embodiment of the invention is shown in greater detail in FIG. 2, wherein the relative dimensions of the individual parts are exaggerated for a better understanding of the invention. The tablet includes a grid substrate 100 made of an electrically non-conductive material. The substrate is made of a constant thickness, with the two opposite surfaces 102 and 104 disposed parallel to one another. The conductors 44 which are disposed on both surfaces 102 and 104 of substrate 100 may be made of any suitable electrically-conductive materials such as copper or the like. Typically, electrically-conductive strips 44a of the X coordinate are disposed on the surface 102 of the substrate so that each conductor is disposed parallel to and are equally spaced from one another; and the conductors 44b which define the Y coordinate are disposed parallel to and equally spaced from one another on the opposite surface 104, perpendicular to the X coordinate conductors. It will be obvious, however, that the conductors disposed on the surface 102 can define the Y coordinate and the conductors disposed on the surface 104 can define the X coordinate. The conductors 44 are disposed on the surfaces 102 and 104 in accordance with techniques generally well known in the printed circuit art. For example, the entire surface of each of the surfaces 102 and 104 is coated with electrically conductive material. Photoresist material, i.e., material which is sensitive to actinic radiation of a preselected portion of the electromagnetic spectrum, is then coated over the electrically-conductive material. A mask which is generally transmissive to the actinic radiation, is provided with areas which are non-transmissive to the actinic radiation. These non-transmissive areas define the pattern to be printed. The mask is placed over the photoresist material. The photoresist material is then exposed with actinic radiation. The mask is then removed and those exposed portions of photoresist material can then be easily removed in accordance with techniques well known in the art. This will expose selected portions of the electrically conductive material which can be chemically removed by etching. By removing the remaining portions of photoresist material, the electrically conductive material remains in the pattern desired. Thus, the conductors 44 can be disposed on the substrate 100 with extreme accuracy so that each conductor is substantially of uniform dimensions along its entire length.

A sheet 106 having writing surface 42 is secured to the substrate 100 over surface 102 by any suitable means such as securing them together with known adhesives or the like. Sheet 106 is made of a rigid, durable, electrically non-conductive material which will permit an electric field to pass therethrough without distorting it. Preferably the sheet is made of a high-pressure laminated plastic layer of melamine and phenolic impregnated materials which is manufactured by the Formica Company of Cincinnati, Ohio, under the trademark "FORMICA". However, it will be understood that other materials may be used. The entire subassembly thus produced is secured by any suitable means to support layer 107. The latter is made of a hard, inflexible, electrically non-conductive material such as a polycarbonate resin or the like. The tablet 40 thus described is suitable for small and intermediate size tablets. For larger tablets, e.g., 4-by-8 feet, the grid conductors 44a and conductors 44b are preferably each disposed on separate substrates in the manner described. The back surfaces of each substrate are then secured together as indicated by dotted line 108 in any suitable manner so that conductors 44a are spaced from and perpendicular to conductors 44b.

Referring to FIG. 3, the signals which are provided for sequentially energizing the X and Y grid conductors are provided by microprogram controller 120 and clock 122. The controller 120 is connected to the up or incremental input, the down or decremental input, the clearing input and the overflow output of an UP/DOWN counter 124, and to the up, down and clearing inputs of a FOUR-BIT counter 126. The overflow output of FOUR-BIT counter 126 is connected to the up and down inputs of UP/DOWN counter 124 by buss line 128. UP/DOWN counter 124 and FOUR-BIT counter 126 are both of a type well known to those skilled in the art and thus they will not be explained in great detail. Generally, when an up pulse is provided to the up input, the counter will count up one increment, and when a down pulse is provided to the down input, the counter will decrement or count down one increment. A pulse provided to the clearing input will clear the counter so that it will begin counting from zero. When the counter reaches its maximum count an overflow pulse is provided at its overflow output. The maximum count which is necessary for UP/DOWN counter 124 to provide an overflow output signal depends on the maximum number of grid conductors that are to be energized in either the X or Y direction. Thus, for example, a nine-bit counter will count to 512 and thereby provide 512 addresses so that a maximum of 512 conductors can be energized in the X direction and 512 conductors can be energized in the Y direction. Counter 126 is preferably a four-bit counter, although smaller or larger capacity counters can be used depending on the design requirements. Counter 126 will count from zero to fifteen and on the next increment, the counter will provide an increment overflow poulse at its overflow output and the count in the counter will go to zero. Likewise, when counter 126 is decrementing, it counts from fifteen to zero and on the next decrement a decrement overflow pulse at its overflow output will issue from counter 126 and the count in counter 126 will go from zero to fifteen. The output of counter 124, which provides signals representative of the present count in counter 124, is connected to the input of X and Y decoders, 130 and 132 respectively. The clocking inputs of the X and Y decoders are connected over buss line 134 to the microprogram controller 120. The outputs of X and Y decoders are connected, respectively, to the X and Y grid conductors. The decoders 130 and 132 are of a type well known in the art and when clocked by a signal at their clocking input will generally provide an output at any one of a plurality of output terminals depending on the binary address input. Thus, for example, when the decoders 130 and 132 are each provided with a nine-bit binary input, depending on the address, one of 512 outputs can be provided. The outputs of the X and Y decoders are connected respectively, to the X and Y grid conductors of tablet 40. The output of counter 124 which is representative of the count in the counter is also connected with the output of counter 126 to the X and Y holding registers 136 and 138. The clocking inputs of registers 136 and 138 are connected independently to the microprogram controller 120 by buss line 134. The outputs of registers 136 and 138 are connected to the interface of a data processor (not shown) which is used with the present invention, but does not form a part thereof. Holding registers are also well known in the art. Registers 136 and 138 receive signals from a binary address input and each when clocked by a signal applied to its clocking input will provide an output which is representative of the signals at its address input. As each grid conductor of tablet 40 is energized by the microprogram controller 120, the electric field created around each conductor can be detected by the stylus 50.

Stylus 50 is of a type well known to those skilled in the art and comprises a capacitive coupling device which is sensitive to ambient electric fields. Stylus or pen 50 preferably includes a switch 140, so that when the latter is closed and an electric field is sensed by probe 50, the probe will provide an AC output signal. The amplitude of the probe output is dependent on the strength of the field detected. The output of stylus 50 is connected to the input of preamplifier 142. The latter is of the type which amplifies and shapes the AC input signal. The output of preamplifier 142 is connected to the inputs of sample and hold circuits 144 and 146. The clocking inputs of circuits 144 and 146 are connected to the clock 148. The latter provides a first clocking signal to circuit 144 and a second clocking signal to circuit 146, of the same frequency as the first clocking signal but 180° out of phase. Circuits 144 and 146 are of a type well known in the art. Generally they provide an output of discrete or digital values which are representative of the input at a series of points and time, the latter being determined by the clocking signal received at the clocking input. Thus, for example, circuits 144 and 146 each provide a digital output, the value of which represents the input signal, at the time when the leading edge of each clocking pulse is received. Each circuit will hold this digital output until the leading edge of the next clocking signal is received.

The output of sample and hold circuit 146 is connected together with the output of circuits 144 to the inputs of subtracting circuits 150 and 152. Circuit 150 subtracts the output B of circuit 146 from the output A of circuit 144, while circuit 152 subtracts the output A of circuits 144 from the output B of circuit 146. The output of circuit 152 is connected to the input of proximity detector 154, the output of the latter being connected to controller 120 by buss line 156. Detector 154 provides an output signal when the amplitude of the input signal received is greater than some predetermined value. The output of subtracting circuit 150 is connected to the input terminal of switch 158, the output terminal of the latter being connected to the input terminal of switch 160. The output of subtracting circuit 152 is also connected to the input of a times two multiplier 162. Multiplier 162 is preferably of the type which amplifies the signal received at its input by a voltage gain of two in a manner well known to those skilled in the art. The output of multiplier 162 is connected to the input terminal of switch 164. The three switches 158, 160 and 164 have an open or closed position input which is connected to controller 120 via buss line 166. The switches may be of any type which will open and close depending on whether a signal is provided over line 166 to the individual switch. The outputs of both switches 158 and 164 are connected at junction 172 to the input of switch 160, the input of integrator 168 and capacitor 170. As well known in the art, the integrator 168 integrates any input signal provided at its input. The output of the integrator is stored in capacitor 170. The output of switch 160, integrator 168 and the other side of the capacitor 170 are connected through the junction 174, to the input of a zero detector 176. The output of detector 176 is connected to controller 120 through buss line 156. Zero detector 170 provides an output signal when the input crosses zero.

The system will be better understood by reference to FIGS. 4A–4D, wherein the logic circuits of the preferred embodiment will be described in greater detail. Referring to FIG. 4A, the microprogram controller 120 is shown in greater detail as including AND gate 200, a one twenty eight counter 202, multiplexor 204, R-S flip flop 206, AND gate 208, read only memory 210, strobe circuit 212, R-S flip flops 214, 216 and 218 and one-shot 220. AND gate 200 has one input connected to clock 122 and its other input connected to the CLKE output of the read only memory circuit 210. AND gates are well known in the art and generally will provide an output signal which is of a logic state 1 when both of its inputs are of a logic state 1 (also called enabling input signals and will provide an output which is of a logic state 0 when either or both of its inputs are of a logic state 0. Thus, as shown, a pulse will be provided at the output of gate 200 when an enabling signal from the CLKE output of read only memory 210 is provided to the input of gate 200 and gate 200 is pulsed by clock 122. The output of gate 200 is connected to the incremental input of counter 202. Counter 202 is of a type well known in the art and will count up one increment when a counting pulse is received at its incremental input and will clear or return to a zero count when receiving a clearing pulse CLRD, provided by the strobe circuit 212. The output DCLK of counter 202 is connected to an input of multiplexor 204. When counter 202 reaches its maximum count and then overflows, an output signal is provided to multiplexor 204. Multiplexors are well known in the art. Generally, multiplexor 204 is of the type that has two types of inputs, branch inputs and address inputs, and a single output. Only one branch input can be transmitted through multiplexor 204 at a time depending upon the address provided at the address inputs. In the preferred embodiment, multiplexor 204 is provided with a three-bit address input, BR0, BR1, BR2 and accordingly depending on the address, will select and provide at its output one of eight branch inputs, SMPL, DCLK, TU, ZCV, SELX, IPEN, S5 and PRX. The first of these inputs SMPL is connected to the Q output of R-S flip flop 206. R-S flip flops are well known in the art and include an S or "set input", an R or "reset input" and Q and $\overline{Q}$ outputs. When the S input of the flip flop is at a logic 1 state or provided with a set signal pulse and the R input is at a 0 logic state or no signal is provided, the flip flop will set the Q output to a logic 1 state and the $\overline{Q}$ output at a logic 0 state. When the S input is at the logic 0 state and R input is at the logic 1 state or provided with a reset signal pulse, the Q output is reset to the 0 state and the $\overline{Q}$ output to the 1 state. The R input of flip flop 206 is connected to the CSMPL output of the strobe circuit 212 while the S input is connected to the output of pulse generator 222. The output of generator 222 determines the pulse repetition rate of the Q output of flip flop 206 and thus the SMPL input to multiplexor 204. The IPEN branch input of multiplexor 204 is connected to the switch 140 of stylus 50, in order to indicate to the controller 120 whether the switch is open or closed. The remaining branch inputs to the multiplexor will be described in greater detail hereinafter in reference to FIGS. 4B–4D. The address inputs of BR0, BR1 and BR2 are connected to three of the outputs of read only memory circuit or ROM 210. The three address inputs are binary coded and thus offer eight different addresses corresponding to the eight branch inputs. The branch output BR of multiplexor 204 is connected to an input of AND gate 208. The other input of gate 208 is connected to NR0, one of the address outputs of read only memory 210. The output of gate 208 is connected to the least significant bit address input of ROM 210. Read only memory circuits are commercially available and can be programmed as desired for any particular design purpose. In the preferred embodiment, ROM 210 is, for example, commercially available from Texas Instruments, a corporation located in Dallas, Texas, and provides a 16-bit output in response to a five-bit address input. Four of the five inputs of ROM 210 are connected to the remaining four address outputs NR1, NR2, NR3 and NR4 of the ROM 210. These address outputs NR0, NR1, NR2, NR3 and NR4 of ROM 210 constitute the ROM address for the next microstep. As will be more apparent hereinafter, by providing an enabling signal over NR0 and properly addressing multiplexor 204, the condition of any one of the eight inputs to the multiplexor may be applied to gate 208, and if a particular condition exists the gate will be enabled and the next microstep determined accordingly. If the condition does not exist gate 208 will not be enabled and a different microstep address will be provided to ROM 210. ROM 210 is "preprogrammed" in accordance with the following table I and the flow chart illustrated in FIG. 6, noting that there are four octave or 32 input addresses of which the 06, 07 and 34 addresses are not used.

TABLE I

| Address | IUP | IDWN | ICL | CLKE | SA3 | SA2 | SA1 | SA0 | BR2 | BR1 | BR0 | NR4 | NR3 | NR2 | NR1 | NR0 | COMMENTS |
|---|---|---|---|---|---|---|---|---|---|---|---|---|---|---|---|---|---|
| 00 | 1 | 1 | 0 | 1 | 0 | 1 | 0 | 0 | 0 | 0 | 0 | 0 | 0 | 1 | 0 | 1 | Clear input from PEN switch, next 5 |
| 01 | 1 | 1 | 0 | 1 | 0 | 1 | 0 | 0 | 0 | 0 | 0 | 0 | 0 | 1 | 1 | 0 | Decrement UP/DOWN counter 124, next 2 |
| 02 | 1 | 1 | 0 | 1 | 0 | 1 | 0 | 0 | 0 | 0 | 0 | 0 | 0 | 1 | 1 | 1 | Decrement UP/DOWN counter 124, next 3 |
| 03 | 1 | 1 | 0 | 1 | 0 | 1 | 0 | 0 | 0 | 0 | 1 | 0 | 1 | 0 | 1 | 1 | Decrement UP/DOWN counter 124, next 25 |
| 04 | 1 | 1 | 0 | 1 | 1 | 0 | 0 | 1 | 0 | 0 | 0 | 0 | 1 | 0 | 0 | 0 | Clear PEN FF 218 (CPROX), next 10 |
| 05 | 1 | 1 | 0 | 1 | 1 | 1 | 0 | 0 | 0 | 0 | 0 | 1 | 1 | 1 | 1 | 1 | Clear SAMPLE FF 206 (CSMPL), next 36 |
| 06 | | | | | | | | | | | | | | | | | Not used |
| 07 | | | | | | | | | | | | | | | | | Not used |
| 10 | 1 | 1 | 0 | 1 | 1 | 1 | 1 | 0 | 0 | 0 | 0 | 0 | 0 | 1 | 0 | 1 | Issue UPDATE pulse (UPDATE), next 5 |
| 11 | 1 | 1 | 0 | 1 | 1 | 0 | 0 | 0 | 0 | 0 | 0 | 1 | 0 | 0 | 0 | 0 | Set PROX FF 216 (SPROX), next 10 |
| 12 | 1 | 1 | 0 | 1 | 1 | 0 | 1 | 0 | 0 | 0 | 0 | 1 | 0 | 0 | 0 | 1 | Clear PEN FF 218 (CPEN), next 11 |
| 13 | 1 | 1 | 0 | 1 | 1 | 0 | 1 | 1 | 0 | 0 | 0 | 1 | 0 | 0 | 0 | 1 | Set PEN FF 218 (SPEN), next 11 |
| 14 | 1 | 1 | 0 | 1 | 0 | 1 | 1 | 1 | 0 | 0 | 1 | 1 | 1 | 1 | 1 | 1 | Clear X SCAN FF 214 (SELY), next 37 |
| 15 | 1 | 1 | 0 | 1 | 0 | 0 | 0 | 0 | 1 | 0 | 1 | 0 | 1 | 0 | 1 | 1 | Branch to 12 on PEN switch open (IPEN), else 13 |
| 16 | 1 | 1 | 0 | 1 | 1 | 1 | 1 | 1 | 0 | 0 | 0 | 0 | 1 | 0 | 1 | 1 | Clear counter 202, next 5 |
| 17 | 1 | 0 | 1 | 1 | 0 | 0 | 1 | 0 | 0 | 1 | 1 | 1 | 0 | 0 | 0 | 1 | Decrement counter 126 (SDWN), BR to 20 if zero crossing set (ZCV) |
| 20 | 1 | 1 | 0 | 1 | 1 | 1 | 0 | 1 | 0 | 0 | 0 | 1 | 0 | 1 | 0 | 0 | Clock counters 124 and 126 into X(Y) holding registers 136 and 138 (CLKXY), next 24 |
| 21 | 1 | 0 | 1 | 1 | 0 | 0 | 0 | 0 | 0 | 0 | 1 | 0 | 1 | 1 | 1 | 1 | Branch to 16 if 128 counter 202 has overflowed (DCLK), else 17 |
| 22 | 1 | 1 | 1 | 1 | 1 | 1 | 1 | 1 | 0 | 0 | 0 | 1 | 0 | 0 | 0 | 1 | Clear 128 counter 202 (CLRD), next 21 |
| 23 | 0 | 1 | 1 | 1 | 0 | 0 | 0 | 1 | 0 | 0 | 0 | 1 | 0 | 1 | 0 | 1 | Close switch 158 increment counter 126 (SUP), next 25 |
| 24 | 1 | 1 | 0 | 1 | 0 | 0 | 0 | 0 | 1 | 0 | 0 | 0 | 1 | 1 | 0 | 1 | Branch to 14 if X SCAN FF 214 set (XSEL), else 15 |
| 25 | 0 | 1 | 1 | 0 | 0 | 0 | 0 | 0 | 0 | 0 | 1 | 0 | 0 | 0 | 1 | 1 | Branch to 22 if 128 counter 202 has overflowed (DCLK), else 23 |
| 26 | 1 | 1 | 0 | 1 | 1 | 1 | 1 | 1 | 0 | 0 | 1 | 1 | 0 | 0 | 0 | 0 | Clear 128 counter 202 (CLRD), next 30 |
| 27 | 1 | 1 | 0 | 0 | 0 | 0 | 0 | 0 | 0 | 0 | 1 | 1 | 0 | 1 | 1 | 1 | Branch to 26 if 128 counter 202 has overflowed (DCLK) else increment counter 202 and repeat 27 |
| 30 | 1 | 1 | 0 | 1 | 0 | 0 | 0 | 0 | 1 | 1 | 0 | 0 | 1 | 0 | 1 | 1 | Branch to 32 if UP/DOWN counter 124 has overflowed (S5), else 33 |
| 31 | 1 | 1 | 0 | 1 | 0 | 1 | 0 | 0 | 0 | 0 | 0 | 0 | 0 | 0 | 0 | 1 | Decrement UP/DOWN counter 124 (FDWN),next 1 |
| 32 | 1 | 1 | 0 | 1 | 1 | 0 | 1 | 0 | 1 | 1 | 1 | 0 | 0 | 1 | 0 | 1 | Clear PEN FF 218 (CPEN) and branch to 4 if PROX FF 216 set (PROX), else 5 |
| 33 | 1 | 1 | 0 | 0 | 0 | 1 | 1 | 0 | 1 | 0 | 1 | 1 | 0 | 0 | 0 | 1 | Increment UP/DOWN counter 124 and branch to 31 if PROX detector 154 set (TU), else 30 |
| 34 | | | | | | | | | | | | | | | | | Not used |
| 35 | 1 | 1 | 1 | 1 | 1 | 1 | 1 | 1 | 0 | 0 | 0 | 1 | 1 | 1 | 1 | 1 | Clear 128 counter 202 (CLRD) and capacitor 170 (ICL), next 27 |
| 36 | 1 | 1 | 0 | 1 | 0 | 0 | 0 | 0 | 0 | 0 | 1 | 1 | 1 | 1 | 1 | 1 | Set X SCAN FF (XSEL) and branch to 36 if SAMPLE FF 206 clear (SMPL), else 37 |
| 37 | 1 | 1 | 0 | 1 | 0 | 0 | 0 | 0 | 0 | 1 | 1 | 1 | 1 | 1 | 0 | 1 | Clear UP/DOWN counter 124 and 126 (UDCLR), |

TABLE I-continued

| Address | I U P | I D W N | I C L E | C L K E | S A 3 | S A 2 | S A 1 | S A 0 | B R 2 | B R 1 | B R 0 | N R 4 | N R 3 | N R 2 | N R 1 | N R 0 | COMMENTS |
|---|---|---|---|---|---|---|---|---|---|---|---|---|---|---|---|---|---|
| | | | | | | | | | | | | | | | | | next 35 |

ROM 210 has a clocking input which is connected to clock 122. The clear input of ROM 210 is connected to the output of one-shot multivibrator 224. The enabling input of one-shot multivibrator 224 is connected to the switch of stylus 50. One-shot multivibrators are well known. Multivibrator 224 provides a single pulse at its output each time an enabling signal is provided at its input. Thus, when switch 140 is closed or opened, a CLEAR signal is generated to the ROM, clearing the latter for a predetermined length of time in order to prevent the system form reacting to electric fields created by switch bounce when switch 140 is open and closed.

In addition to the address outputs NR0, NR1, NR2, NR3, NR4, BR0, BR1, And BR2, ROM 210 provides the four address inputs SA0, SA1, SA2, and SA3 to strobe circuit 212, CLKE which is connected to the input of OR gate 200 as previously described, and the switch control inputs IUP, IDWN and ICL, which are respectively provided to switch 158, 160 and 164. The strobe address inputs are binary coded and thus depending on the inputs can selectively provide any one or several of the fifteen control signals SUP, SDWN, FUP, FDWN, UDCLR, XSEL, YSEL, CPROX, SPROX, SPEN, CPEN, CSMPL, CLKXY, UPDATE and CLRD. The XSEL and YSEL outputs are respectively connected to the S and R input of X SCAN flip flop 214. The Q and $\overline{Q}$ outputs of flip flop 214 are utilized for enabling the X and Y holding registers as described in greater detail with respect to FIG. 4B hereinafter. The SPROX and CPROX outputs are respectively connected to the S and R inputs of PROX flip flop 216. The Q output of flip flop 216, PRX is connected to an input of multiplexor 204, as previously described. The SPEN and CPEN outputs of strobe circuits 212 are connected to the PEN flip flop 218. The UPDATE output of strobe circuit 212 is connected to the one-shot multivibrator 220. The remaining outputs of strobe 212, i.e. SUP, SDWN, FUP, FDWN, UDCLR, and CLKXY, together with the output of flip flop 214 are provided for controlling the counter 124, counter 126 and clocking the X and Y holding registers 136 and 138.

More specifically, referring to FIG. 4B, the SUP output and the SDWN output are respectively connected to the up and down inputs of counter 126. The UDCLR output is connected to the clearing inputs of both counters 124 and 126 and the FUP and FDWN outputs are respectively connected to an input of the OR gates 230 and 232. The incremental overflow output 234 of counter 126 is connected to an input of OR gate 230 and the decremental overflow output 236 of counter 126 is connected to an input of OR gate 232. The output of OR gates 230 and 232 are respectively connected to the incremental and decremental inputs of counter 124. The overflow outputs of counter 124 are connected to the S5 input of multiplexor 204. The outputs GA0–GAn of counter 124 are connected to the address inputs of X and Y decoders 130 and 132. These inputs are also connected to the address inputs of X and Y holding registers 136 and 138 (as described in FIG. 3). The outputs provided on the lines GA0–GAn is indicative or representative of the count in counter 124. The outputs GP0–GP3 of FOUR-BIT counter 126 which are indicative of the count in the counter are also connected to four of the address inputs of X and Y holding registers 136 and 138. The CLKXY output of strobe 212 is connected to an input of two AND gates 238 and 240. The SELX output of flip flop 214 is connected to the input of OR gate 238 while the SELY of flip flop 214 is connected to the input of gate 240. The output of gates 238 and 240 are respectively connected to the enabling or clocking inputs of the X and Y holding registers 136 and 138.

Referring to FIG. 4C, the input terminal 300 is provided with an AC filter comprising capacitor 302 and resistor 304. As well known in the art, AC filters will pass all alternating current signals while blocking direct current signals. The output of the filter is connected to the input of preamplifier 142. Preamplifier 142 is of a type which will amplify and shape the input signal. When an input signal is provided at input of amplifier 142, the output of amplifier 142 will be of the same frequency and have a magnitude which is proportional to the input signal. The output of amplifier 142 is connected to the inputs of sample and hold circuits 144 and 146, the latter circuits being clocked by clock 148 in a manner previously described in reference to FIG. 3.

The outputs of A and B of sample and hold circuits 144 and 146 are connected to subtractor circuits 150 and 152. The latter include, respectively, operational amplifiers 310 and 312. The output of circuit 144 is thus connected through resistor 314 to the direct input of amplifier 310 and through resistor 316 to the inverting input of amplifier 312. The output B of circuit 146 is connected through a resistor 318 to the inverting input of amplifier 310 and to the direct input of amplifier 312 through resistor 320. Operational amplifier 310 is provided with the feedback resistor 322 and a feedback capacitor 324, the former being connected in parallel with the latter. Both are connected from the output of amplifier 310 to its inverting input so that the output is equal to both the direct and inverting inputs during steady state conditions. Similarly, a feedback resistor 326 and a feedback capacitor 328 are connected in parallel between the output of amplifier 312 and its inverting input so that the output is equal to both its inputs during steady state conditions. The outputs of the operational amplifiers 310 and 312 are connected to the decoding position of the system which is described in detail in FIG. 4D.

In FIG. 4D the output of operational amplifier 312 is also connected to the proximity detector 154. Proximity detector 154 comprises resistor 332, which is connected to the direct input of differential amplifier 334. The inverting input of amplifier 334 is connected to the top of variable resistor 336, the latter being connected on one side to a negative DC biasing potential and its other end to ground. Both the direct and inverting inputs of amplifier 334 are capacitively coupled to ground through capacitors 338 and 340 for filtering out undersiable AC components to its inputs. The output TU of amplifier 334 is connected to the TU input of multiplexor 204, as previously described in reference to FIG. 4A.

The output of operational amplifier 312 is also connected through resistor 330 to the input of switch 164 and the output of operational amplifier 310 is connected through resistor 342 to the input of switch 158. As will be more evident hereinafter, the value of resistor 330 is approximately twice the value of resistor 342 and, thus as will become more evident hereinafter, resistor 330 functions as times two multiplier 162. As previously described, the outputs of switches 158 and 164 are connected through the junction 172 to the input of switch 160, the capacitor 170 and the negative input of integrator 168. The input terminal which determines the open or close mode of switches 158, 164 and 160 are respectively connected to the IUP, IDWN and ICL outputs of ROM 204. The output of switch 160 is connected to resistor 344, which in turn is connected to output junction 174. Junction 174 which connects the output of switch 160, capacitor 170 and the integrator 168 is connected to the input of the zero detector 176. Detector 176 comprises at its input resistor 346 which is directly connected to the direct input of differential amplifier 348. The negative or inverting input terminal of amplifier 348 is connected to ground. The output of amplifier 348 is connected to the ZCV input of multiplexor 204. As well known in the art, amplifier 348 provides a positive DC potential when the potential at its direct input exceeds the potential at its inverting input, and provides a zero or negative DC potential when the potential at its direct input is equal to or less than its potential at its inverting input.

Referring to Table 1 and FIGS. 3–7, the operation of the system will be described. ROM 210 will address strobe 212 so that the X-grid conductors are continuously sequentially energized at a predetermined rate when the stylus 50 is not in proximity of the table surface 42 of the table 40. Accordingly, a clocking signal FUP is provided from strobe 212 to OR gate 230. The latter is thus enabled for each pulse received to provide at its output a clocking signal to the UP input of counter 124. Referring to the ROM program of Table 1 and the flow chart of FIG. 5, each time the counter 124 increments (address 33) the multiplexor is addressed so that the TU input appears at its output. Thus, (indicating the probe is in proximity to an energized wire), if detector 154 provides a signal TU, the gate 208 will be enabled and the next address provided to ROM 210 will be address 31. If, however, no signal is provided by detector 154, the TU signal will not enable the gate 208 and ROM 210 will see as its next address, address 30. When proximity has not been detected, and thus ROM 210 is addressed at 30, multiplexor 204 is addressed so that the S5 input appears at its output. If the counter 124 has overflowed the signal provided by S5 will disable gate 208 and the next ROM address will be 32. However, if counter 124 has not overflowed gate 208 will be enabled so that ROM 210 will be addressed at 33. Thus, if proximity has not been detected and counter 124 has not overflowed, counter 124 will continue to increment during the fast scanning period. When the X scan is completed counter 124 overflows so that the output signal S5 is provided to multiplexor 204. This causes gate 208 to become disabled and the next ROM address to be 32 instead of 33. At address 32 ROM 210 addresses strobe 212 so that a reset signal is provided over the CPEN output of the latter. A reset signal over CPEN resets PEN flip flop 218 so that no signal is provided from flip flop 218 to the interface. Also, at address 32, the multiplexor 204 is addressed so that the PRX input appears at its output. If an enabling signal appears at the output of multiplexor 204, indicating that the PROX flip flop 216 has not been set the output of multiplexor 204 will enable gate 208 so that the next ROM address is 5. At address 5, ROM 210 clears the SAMPLE flip flop 206 causing the output of the flip flop to change its logic state. The multiplexor 204 is also addressed so that the SMPL input appears at its output. As long as SAMPLE flop flop 206 is clear the gate 208 will be disabled and the ROM address will be 36. While the ROM is addressed at 36 the X SCAN flip flop 214 is set, wherein the ROM 210 addresses strobe 212 through SA0, SA1, SA2 and SA3, so that a signal is provided at the XSEL output. This signal sets flip flop 214 so that the SELX output of flip flop 214 goes to a logic state 1 and the SELY output of flip flop 214 goes to a logic state 0. The ROM address will remain at 36 until pulse generator 222 provides a pulse to the set input of SAMPLE flip flop 206. When SAMPLE flip flop 206 is set the SMPL output of flip flop 206 changes so that the output of multiplexor 204 changes to enable gate 208. When gate 208 is enabled the ROM address changes from address 36 to address 37. During the time in which ROM 210 is addressed at 36, the information which is provided by the electrographic system can flow to the interface. Thus, it will be apparent that by varying the pulse repetition rate of generator 222, the rate of flow of data to the interface can be controlled.

Once gate 208 is enabled and the address of ROM 210 changes to 37, the ROM 210 addresses strobe circuit 212, which in turn generates a signal at its UDCLR output, in order to clear counters 124 and 126. The ROM will address itself next to address 35, which causes ROM 210 to address strobe 212, which in turn generates a signal at its CLRD output to clear the one twenty either counter 202. Simultaneously, ROM 210 generates a signal over its ICL output in order to close switch 160. This clears the integrating capacitor 170, by allowing any change which may be stored therein to be discharged through resistor 344. The ROM then goes into a loop in order to insure that the one twenty eight counter 202 has cleared. This is accomplished by the fact that the multiplexor 204 is addressed so that the DCLK output of counter 202 appears at the output of multiplexor 204 to the gate 208. The counter continues to increment until it over flows, whereupon the output signal over DCLK causes the output signal of multiplexor 206 to diable gate 208 so that the address to ROM 210 changes from 27 to 26. When ROM 210 is addressed at 26 the strobe circuit is again addressed so that a signal is generated over CLRD to clear counter 202. When counter 202 is cleared, ROM 210 addresses itself to address 30 where the S5 output of counter 124 is transmitted through multiplexor 204 to either enable or disable gate 208. Since counter 124 has just been cleared, gate 208 will be enabled so that the ROM addresses itself to address 33. The ROM then goes into its fast X scan whereupon each X conductor of the grid can be sequentially energized until counter 124 overflows or proximity detector 154 provides a signal. As long as no signal is provided by detector 154, the ROM remains in the fast X scan loop until counter 124 overflows, whereupon the process described will be repeated.

When data is to be processed, and transferred to the information retrieval system, the stylus 50 is placed on or near the surface 44 of tablet 40 and the probe or pen switch 140 is closed. When switch 140 is closed a signal pulse is provided to one-shot 224, which in turn provides a CLEAR signal to ROM 210. This CLEAR signal causes ROM 210 to see a 00 address. Thus, any electric fields generated by switch 140, when the latter is opened or closed, will not affect the processing of information generated from the grid conductors. From the 00 address, the ROM 210 will address itself to the 5 address. As previously described, the SAMPLE flip flop 206 will be cleared and ROM 210 will then be addressed to 36 to set the X SCAN flip flop 214 until the SAMPLE flip flop 206 has been set by pulse generator 222. The ROM 210 then addresses itself to address 37 to clear counters 124 and 126 whereupon it is addressed to address 35 to cler counter 202 and capacitor 170. The ROM then goes into a loop at address 27 to insure counter 202 has been cleared. When counter 202 overflows the address changes to 26 so that counter 202 is cleared. The ROM 210 then begins the fast X scan by providing the FUP clocking signal through gate 230. Since the stylus 50 is near the surface 42 of tablet 40, the X scan will continue until a grid conductor near the probe is energized which will provide an electric field between the two of sufficient strength to provide a signal at the input of preamplifier 142, which in turn provides a signal at the input of sample and hold circuits 144 and 146. The latter are clocked by clock 148 and provide outputs to the inputs of subtractor circuits 150 and 152. If the electricfield is strong enough, the magnitude of the output potential of circuit 152, which is applied to the direct input of amplifier 334 of detector 154 will exceed the potential, determined by the value of resistor 336, at the inverting terminal of amplifier 334 so that an output signal is provided over TU to the multiplexor 204. Since multiplexor 204 has been addressed so that the TU input appears at its output, when the signal is provided from detector 154, gate 208 will be enabled so that instead of ROM addressing itself to address 30, it will be addressed to address 31.

Since the probe is now in proximity to the grid and the pen switch 140 is closed, the system can now begin its slow SCAN. At address 31, ROM 210 provides an address signal to strobe 212, so that the latter provides a signal over FDWN to gate 232, which in turn provides a signal pulse to decrement the counter 124 by 1. The next three successive ROM addresses are 01, 02 and 03 so that three additional FDWN enabling pulses are provided in succession to gate 232 so that the count in counter 124 decrements by an additional three. Thus, the counter 124 has decremented by four so that the grid conductor which is to be energized is spaced by three grid conductors from the grid conductor which was energized when the electric field was detected and a signal was provided by detector 154. After the fourth decrement signal has been provided to counter 124, the ROM 210 is addressed to 25. At address 25 an output signal is provided over CLKE which in turn enables gate 200. This will start the one twenty eight counter 202 to begin its count since the other input of gate 200 is clocked by clock 122. Simultaneously, at the same clocking rate, the SUP input of counter 126 is clocked and the particular grid conductor addressed by counter 124 is clocked. Further, the IDWN and ICL outputs of ROM 210 open switches 164 and 160 respectively, while IUP closes switch 158. The counter 126 counts from zero to fifteen, during the time of which the addressed grid conductor is pulsed 16 times. When the counter 126 reaches its maximum count, an overflow signal pulse is provided at the output 234 to gate 230, which in turn increments counter 124 by one and the counter 126 returns to zero. Counter 126 then counts from zero to fifteen during which time the next grid conductor which has been addressed will be pulsed 16 times whereupon counter 126 overflows providing an increment pulse to the UP input of counter 124. This will continue until the one twenty eight counter overflows or eight successive grid conductors have been energized. During this portion of the slow scan, the system will integrate positively. More specifically when each grid conductor is pulsed 16 times, the signal sensed by probe 50 will resemble the pulses shown in FIG. 6A. These pulses are amplified and shaped by the preamplifier 142 and applied to the input of circuits 144 and 146. The input of circuit 144 is sampled by the sampling signal shown in FIG. 6B which is of the same frequency and in phase with the pulses provided at the input. Thus, the output signal pulse A of circuit 144, shown in FIG. 6D, will have a magnitude which is proportional to the electric field or distance between the stylus 50 and the energized wire. The input of circuit 146 is sampled by the sampling signal shown in FIG. 6C to provide an output as shown in FIG. 6E. The output A of circuit 144 is applied to the positive input of amplifier 310 while output B of circuit 146 is applied to the negative input. This results in the potential at the positive input to exceed potential at the negative input. The output of amplifier 310 A–B, shown in FIG. 6F, will have a magnitude dependent on the potential difference between signal A and signal B. Similarly, the potential at the negative terminal of amplifier 312 exceeds the potential at the positive terminal so that the output, shown in FIG. 4G, will go negative and have a magnitude dependent on the potential difference between signals A and B. Since switch 158 is closed and switch 160 and 164 are opened, only the output of circuit 150 is applied to the integrator 168. As shown in FIG. 7, during positive integration the signal applied to integrator 168 may, for example, begin at time $t1$ wherein the K line of the X grid conductors is energized until $tz$ when the K + 1 line is energized. The K + 1 line is closer to probe 50 so that the magnitude of the output of circuit 150 increases as shown between $t2$ and $t3$. At $t3$, the K + 2 line (the closest grid conductor) is energized and the magnitude of the output of circuit 150 increases. At $t4$ the K + 3 grid line is energized, but since the K + 3 line is farther from stylus 50 than the K + 2 line and thus the magnitude of the output circuit 150 decreases. Similarly, during the time between $t5$ and $t6$, the K + 4 grid line is energized and the output of circuit 150 again decreases. At the end of the positive integration portion of the slow scan, the integrated voltage output of integrator 168, which is representative of the area under the curve between $t1$ and $t6$ is stored on capacitor 170.

Referring again to the flow chart of FIG. 5, at the end of the positive integration, counter 202 provides an overflow signal to the DCLK input of multiplexor 204.

Multiplexor 204 is addressed so that the DCLK input appears at its output and thus will disable gate 208 changing the ROM address from 23 to 22. At address 22 ROM 210 provides an input signal to strobe 212 which in turn provides an output signal at CLRD in order to clear the counter 202. The ROM then addresses itself to address 21 wherein the negative integration process can begin. At address 21 the output CLKE continues to enable gate 200 so that the clock 122 clocks counter 202. Simultaneously, at the same clocking rate, the SDWN input of counter 126 is clocked and the last grid conductor addressed by counter 124 is clocked. Further, the UIP and ICL outputs of ROM open switches 158 and 160 respectively, while IDWN closes switch 164. The counter 126 counts from 15 to zero, during the time of which the addressed grid conductor is pulsed 16 times. When counter 126 reaches its minimum count, i.e., zero, an overflow signal is provided at output 236 to enable gate 232. When the latter is enabled, a signal is provided to the DWN input of counter 124, so that the latter decrements by one. Counter 126 will then return to fifteen and begin counting down as it receives the clocking pulses over SDWN. Counter 126 then counts from 15 to zero while the next grid conductor addressed by counter 124 will be pulsed sixteen times. When counter 126 overflows a decrement pulse will be provided to gate 232 which in turn provides a pulse to the down input of counter 124. This will continue until the value of the voltage stored in capacitor 170 returns to zero. More specifically, during this portion of the slow scan, the decoder integrates negatively. When each grid conductor is pulsed 16 times, the signal sensed by probe 50 will resemble the pulses shown in FIG. 6A. These pulses are again sampled in circuit 144 by the sampling signal such as shown in FIG. 4B to provide the output signal such as shown in FIG. 4D. The signals sensed are also by circuit 146 by the signal shown in FIG. 4C to provide the output signal illustrated in FIG. 4E.

Again the outputs A and B are applied to the circuits 150 and 152 to provide the respective outputs shown in FIGS. 4F and 4G. However, switch 158 is now open and switch 160 is closed. Since the resistance value of resistor 330 is twice that of resistor 342, the former will have twice the voltage drop as the latter. Thus, the potential applied to integrator 168 during negative integration is twice that applied to the integrator during positive integration. Since the signal is inverted as shown in FIG. 6G, this will cause integrator 168 to integrate down, and capacitor 170 to discharge. As shown in FIG. 7 during the negative integration portion of the slow SCAN, the signal applied to integrator 168 at time $t7$, wherein the K + 4 line of the grid conductors is energized until $t8$ when the K + 3 line is energized, will be of opposite polarity and twice the magnitude of the voltage applied to the integrator 168 between $t5$ and $t6$, when the K + 4 line was energized during positive integration. Integrating the signal between $t7$ and $t8$, capacitor 170 discharges at twice the rate that it charges. When the capacitor completely discharges, the zero potential is applied to the positive input of amplifier 348 of the zero detector 176. When this occurs an output signal ZCV as provided by detector 176, which is applied to the input of multiplexor 204, the latter being addressed to ROM 210. The address of ROM 210 will next become 20 whereupon the clocking signal over FDWN to counter 126 will end. Simultaneously, a signal is provided at the CLKXY output of strobe 212 in order to enable gate 238. The output of the enabled gate 238 provides a clocking signal to the X holding register 136. The counter in counters 124 and 126 will then be entered into register 136. Specifically, the GPO–GPn input will provide a count in counter 124 which represents the last grid conductor to have been energized during negative integration before the ZCV signal is provided. The GAO–GA3 input will provide the last count in counter 126 when the ZCV signal is provided. This count represents the approximate distance between the last grid conductor to have been energized and the next grid conductor which would have been energized had not the ZCV signal been provided. This approximation is then 1/16 of the spacing between each grid conductor since counter 126 is a four-bit counter. It should be noted that the ZCV signal should be provided before one twenty eight counter 202 overflows during negative integration, the DCLK signal is applied to multiplexor 204 which in turn provides a disabling signal to gate 208, which changes the ROM address from 17 (the negative integration loop) to 16. This will clear counter 202, and begin the X scanning process again.

Once the X register 136 is clocked, the address of ROM 210 changes from 20 to 24. Since the present scan is in X, the SELX output of the X scan flip flop 214 is applied to multiplexor 204 and disables gate 208. Thus, the next address provided to ROM 210 is 14, whereupon the R input of the X scan flip flop 214 receives a signal. This resets flip flop 214 so that the SELX output goes to a logic 0 state and the SELY input to gate 240 goes to an enabling or logic 1 state. ROM 210 is then addressed to address 37 whereupon the program as previously described with respect to the X grid conductor will occur for the Y grid conductors. Specifically, UP/DOWN counter 124 and FOUR-BIT counter 126 are cleared. Next the one twenty eight counter 202 as well as capacitor 170 are cleared. The Y grid conductors are then sequentially energized in the fast scan in the same manner as described until the proximity detector 154 detects a signal. The slow scan then begins. First the positive integration and then the negative integration. When the slow scan is completed the ROM 210 will have an address of 20 in which the ROM 210 addresses strobe 212 so that the latter provides a CLKXY signal to the gate 240 so that the latter will be enabled to provide a clocking signal to the Y holding register 138. Thus, the counts in counter 124 and counter 126 are clocked into the Y holding register.

After clocking the Y coordinate into the Y holding register, the information in the X and Y registers are now ready to be transferred to an information storage system. Since the X scan flip flop 214 has been cleared, the SELX input to multiplexor 204 will be transmitted through the latter and enable gate 208. Thus, the next ROM address, instead of being 14 will be 15. At address 15, the multiplexor 204 is addressed so that the IPEN input appears at its output. If the pen switch 140 is closed, the output of multiplexor 204 will enable gate 208. ROM 210 will provide an input signal to strobe circuit 212 so that PEN flip flop 218 is set by a signal at the output SPEN. A signal will be provided from flip flop 218 to the interface. This indicates to the information storage system that the switch 140 is closed. If the switch is open, the output of the multiplexor 204 will not enable gate 208. Thus, ROM 210 will address strobe circuit 212 and the latter will provide an output signal at the CPEN output so that the PEN flip flop 218 is cleared. After the PEN flip flop 218 has either been set or cleared, the ROM address is set at 11. At this address, ROM 210 addresses strobe 212 so that the SPROX output of the latter will set PROX flip flop 216. The output of the flip flop 216 is transmitted to the input of multiplexor 204. By branching the PRX input through multiplexor 204, gate 208 is disabled changing the ROM address from 11 to 10. This causes an UPDATE pulse to be issued from strobe 212 to the inteface, indicating data is to be received. The next ROM address is 5 so that the SAMPLE flip flop 206, is cleared and information can be transmitted to the interface. If the probe switch 140 remains closed, and probe 50 remains in proximity to the tablet surface 42, of table 40, the ROM begins an X scan as described to determine the next X and Y coordinates. When switch 140 is opened however, counters 124, 126 and 202 as well as capacitor 170 are cleared as described previously. Counter 124 is incremented until it overflows. The ROM address becomes 32 whereupon strobe 212 is addressed so that its output provides a signal at the CPEN output to reset the PEN flip flop 218. The X scan will then be repeated as previously described until the pen 50 is in proximity to the grid and pen switch 140 is closed.

The above electrographic system described is an improved accurate system for continuously processing graphical data into machine-readable signals.

Since certain changes may be made in the above apparatus without departing from the scope of the invention herein involved, it is intended that all matter contained in the above description and shown in the accompanying drawing shall be interpreted in an illustrative and not in a limiting sense.

What is claimed is:

1. An electrographic system comprising:
a plurality of substantially parallel, equally-spaced electrical conductors;
means for sequentially energizing each of said conductors at a first rate so as to provide an electric field in proximity to each energized one of said conductors;
probe means for sensing the electric field provided by at least one of said conductors to provide a first signal responsively to the sensed field;
means responsive to said first signal for arresting said energizing at said first rate and for sequentially energizing a selected number of said conductors adjacent to and including said one conductor, each for a preselected period of time and at a second rate so as to provide a plurality of second signals each representative of the electrical field strength between said probe means and each of said selected number of conductors;
means for determining the time centroid of said second signals and for generating in response to the determination of said time centroid, a third signal representative of the position of said probe means relative to said plurality of conductors.

2. An electrographic system comprising:
a first plurality of electrical conductors and a second plurality of electrical conductors arranged so as to form a coordinate system;
means for sequentially energizing at a first rate each of the conductors of said first plurality thereof so as to provide an electric field in proximity to each energized one of said first plurality of conductors;
probe means for sensing the electric field provided by at least one of said first plurality of conductors during sequential energization thereof so as to provide a first signal responsively to the sensed field;
means responsive to said first signal for arresting said energizing at said first rate and for sequentially energizing a selected number of said first plurality of conductors, each for a preselected period of time and at a second rate, so as to provide a plurality of second signals each representative of the electrical field strength between said probe means and each of said selected members of conductors;
means for determining the time centroid of said second signals and for generating in response to the determination of said time centroid of said second signals, a third signal representative of the position of said probe means relative to said first plurality of conductors;
means responsive to said third signal for sequentially energizing at a third rate each of the said second plurality of conductors so as to provide an electric field in proximity to each energized one of said second plurality of conductors so that said probe means provides a fourth signal in response to sensed electric fields around the conductors of said second plurality in proximity to said probe means.
means responsive to said fourth signal for arresting said energizing at said third rate and for energizing a selected number of said second plurality of conductors for a second preselected period of time and at a fourth rate, so as to provide a plurality of fifth signals each representative of the electric field strength between said probe means and each of said selected number of conductors of said second plurality during said second preselected period of time; and
means for determining the time centroid of said fifth signal and for generating in response to the determination of said time centroid of said fifth signal, a sixth signal representative of the position of said probe means relative to said second plurality of conductors.

3. The system in accordance with claim 2, wherein said means responsive to said first signal includes means for detecting said first signal and for providing a seventh signal when the amplitude of said first signal exceeds a predetermined value.

4. The system in accordance with claim 2, wherein said means responsive to said first signal includes means for sampling said first signal with an eighth sampling clock signal to provide a ninth sampled signal and means for sampling said first signal with a tenth sampling clock signal to provide an eleventh sampled signal.

5. The system in accordance with claim 4, wherein said eighth and tenth sampling clock signals are 180° out of phase.

6. The system in accordance with claim 4, wherein said means responsive to said first signal further includes first subtracting means for subtracting said eleventh sampled signal from said ninth sampled signal so as to provide a twelfth difference signal and second subtracting means for subtracting said ninth sampled signal from said eleventh sampled signal so as to provide a thirteenth difference signal.

7. The system in accordance with claim 6, wherein said means for determining the time centroid of said second signals comprises means for multiplying said thirteenth difference signal by a factor of two to provide a modified thirteenth difference signal, integrating means for integrating said eleventh and said modified thirteenth difference signals, and storage means for storing the output of said integrating means.

8. The system in accordance with claim 7, wherein said means for providing said third signal further comprises means for applying said eleventh difference signal to said integrating means so as to store the output of said integrating means in said storage means, means for applying said thirteenth modified difference signal to said integrating means for discharging the stored signal in said storage means.

9. The system in accordance with claim 8, wherein said means for energizing each of the conductors of said first plurality and said means for energizing each of the conductors of said second plurality includes a counter, means for clocking said counter and means for selectively applying the output of said counter to the conductors of said first plurality and the conductors of said second plurality, register means for holding a signal representative of the count in said counter, and means responsive to the output of said storage means for clocking the count of said counter into said register means.

10. A method of determining at least one coordinate position of a stylus relative to a plurality of substantially parallel, equally-spaced electrical conductors comprising the steps of:
sequentially energizing each of said conductors at a first rate so as to provide an electric field in proximity to each energized one of said conductors;
sensing with said stylus the electric field provided by at least one of said conductors to provide a first signal responsively to the sensed field;
arresting the sequential energization of said conductors at said first rate;
sequentially energizing a preselected number of said conductors, for a preselected period of time and at a second rate so as to provide a plurality of second signals each representative of the electric field strength between the stylus and each of the preselected number of conductors;
determining the time centroid of the second signals; and
generating in response to the determination of said time centroid, a third signal representative of the position of said stylus relative to the plurality of conductors.

* * * * *